United States Patent [19]

Kerr

[11] 4,159,625
[45] Jul. 3, 1979

[54] CONTROL FOR GAS TURBINE ENGINE

[75] Inventor: Walter B. Kerr, West Palm Beach, Fla.

[73] Assignee: United Technologies Corporation, Hartford, Conn.

[21] Appl. No.: 764,610

[22] Filed: Feb. 1, 1977

[51] Int. Cl.$^2$ .......................... F02K 3/02; F02C 9/08
[52] U.S. Cl. ........................................ 60/204; 60/236; 60/238; 60/242; 60/243
[58] Field of Search ................................ 60/235–239, 60/243, 39.28 R

[56] References Cited

U.S. PATENT DOCUMENTS

| | | | |
|---|---|---|---|
| 2,848,870 | 8/1958 | Eastman | 60/39.28 R |
| 2,989,849 | 6/1961 | Torell et al. | 60/39.28 R |
| 3,511,047 | 5/1970 | Yates | 60/39.28 R |
| 3,764,785 | 10/1973 | Harner et al. | 60/39.28 R |
| 3,852,956 | 12/1974 | Martin | 60/39.28 R |
| 3,854,287 | 12/1974 | Rembold | 60/238 |
| 3,867,717 | 2/1975 | Moehring et al. | 60/39.28 R |

*Primary Examiner*—Robert E. Garrett
*Attorney, Agent, or Firm*—Norman Friedland

[57] ABSTRACT

Increased thrust during the transonic flight mode of an aircraft powered by a gas turbine engine is realized by a closed loop control that closes the loop on the pressure ratio across the fan by adjusting fuel flow and/or exhaust nozzle area in a turbofan, variable exhaust nozzle installation. Fan pressure ratio is scheduled as a function of corrected fan speed and actual pressure ratio provides an error signal to readjust engine operation to null out this error signal. A turbine inlet temperature limit signal is generated to prevent inadvertent overheating and it or this pressure ratio error signal is selected for providing the lower fuel flow value.

9 Claims, 2 Drawing Figures

CONTROL FOR GAS TURBINE ENGINE

BACKGROUND OF THE INVENTION

Typically, the fuel control serves to provide optimum engine operation by open loop scheduling of fuel flow as a function of compressor speed and compressor pressure for steady state operation and compressor speed, compressor inlet temperature/or compressor inlet pressure and compressor discharge pressure for acceleration limiting. For example such a control is exemplified by the JFC-60 manufactured by the Hamilton Standard Division of United Technologies Corporation and U.S. Pat. No. 2,822,666 granted to S. G. Best on Feb. 11, 1958 assigned to the same assignee. In these controls fuel flow is scheduled by providing a $W_f/P_3$ signal as a function of the above mentioned parameters and multiplying that signal by actual $P_3$, where $W_f$ is fuel flow in pounds per hour and $P_3$ is compressor discharge pressure in psi to obtain proper fuel flow. Because of the advent of more complex engines and their cycles, the inclusion of variable engine geometry such as variable vanes, exhaust nozzles and the like; a supervisory control which may be electronic, monitors and computes these engine variables to coordinate them and/or assess engine performance so as to readjust fuel flow and/or manipulate these engine variables so as to achieve a more optimum engine performance for the entire flight envelope. Such a supervisory control is disclosed in U.S. Pat. No. 3,797,233 issued to William L. Webb et al on May 19, 1974 and also assigned to the same assignee, and incorporated herein by reference.

Notwithstanding the above, such heretofore known controls inherently have certain deficiencies occasioned merely by having open loop scheduling. The schedule is primarily predicated on a particular engine characteristic and is designed to provide optimum performance initially. It does not, however, account for errors and deficiencies that arise out of the engine aging. Additionally, errors and deficiencies occur as a result of bleeding compressor air, extracting horsepower, inaccurate sensors, pressure distortions and the like.

I have found that I can obtain an improved thrust performance of say 10–20% gain during transonic aircraft flight modes by closing the loop on fan pressure ratio which inherently obviates these errors and deficiencies during this regime. In a turbofan installation this invention contemplates readjusting fuel flow to the gas generator to operate at scheduled fan pressure ratio. Where the installation includes variable exhaust nozzles the area thereof can be manipulated in lieu of the fuel flow adjustments.

In either event, by holding fan pressure ratio within a 2% tolerance of its schedule the following advantages can be realized.

1. 8–10% pressure ratio uncertainty due to $\pm 6°T_{T2}$ error is eliminated ($\pm 6°T_{T2}$ schedules $N_2$ too high which results in 8–10% high fan pressure ratio).

2. High spool variable vane error is compensated because primary fuel flow will adjust to maintain fan turbine work.

3. Deterioration of core engine will be compensated because the primary fuel flow will adjust to maintain fan turbine work.

4. Fan vane error effects on surge line will be compensated somewhat because surge pressure ratio will maintain operating pressure ratio as $f(N_1C_2)$ direction of corrected $N_1$ speed. (current control will match up fan pressure ratio with cambering)

5. $P_{T2}$ probe can be located in average low pressure area so that during maneuver when low pressure exists, the control will automatically reduce fan pressure ratio.

SUMMARY OF THE INVENTION

The advantages of the present invention are achieved by scheduling fan or engine pressure ratio directly as a function of corrected fan rotor speed, and adjusting either the main gas generator fuel flow or the nozzle area in response to the error between the scheduled fan or engine pressure ratio and the actual or sensed fan or engine pressure ratio. The corrected fan rotor speed is produced by directly measuring fan rotor speed and fan inlet temperature. The scheduling may be performed by electronic, mechanical or other well-known types of hardware, or may be performed by storing the appropriate functions in a digital computer.

DESCRIPTION OF THE PREFERRED EMBODIMENT

While the preferred embodiment describes this invention as used on a specific turbofan twin spool engine, as one skilled in the art the teachings of this invention can be applied to other engines. Additionally, parameters other than fan pressure ratio can be utilized, like engine pressure ratio, low compressor ratio, without deviating from the scope of this invention.

Figure 1:
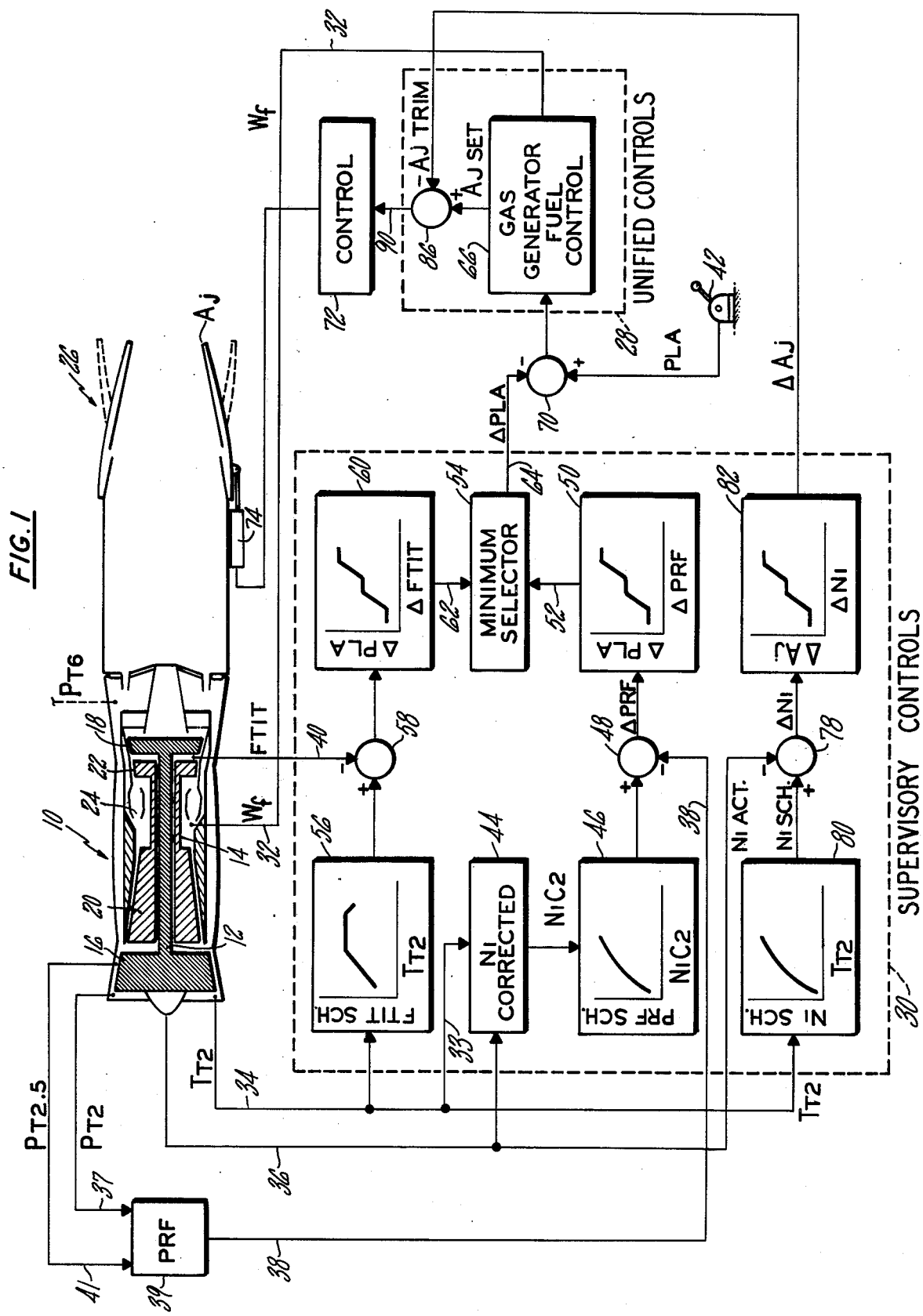
FIG. 1 is a schematic drawing showing a turbofan engine and control illustrating this invention utilizing fuel flow to close loop on fan pressure ratio.

Referring to FIG. 1 there is shown in schematic form a typical twin spool augmented turbofan engine 10 having a low spool 12 and a high spool 14. The front compressor or rotor portion 16 of the low spool 12 is denoted as the fan and is driven by the fan turbine 18 to which it is connected. The compressor or rotor portion 20 of the high spool is driven by the high turbine 22. Burner 24 to which fuel is supplied, provides energy to drive the turbines 18 and 22. The gases which pass through the turbines are expanded through a variable area exhaust nozzle 26 to produce thrust. Other details of construction of the engine 10 are well known to those skilled in the art and will not be described in detail.

Included in typical present-day augmented turbofan engines are a plurality of controllable or variable components such as variable inlets and guide vanes, compressor bleeds and variable nozzles such as exhaust nozzle 26. The burner 24 is also supplied fuel in a controlled amount by a fuel control which is responsive to selected engine and flight parameters. Because of the complex interrelationships in the engine, any change in one of the engine variables will affect the other variables. To accurately control the engine during its various modes of operation, supervisory and/or unified control systems have been developed which respond to a plurality of sensed engine and flight parameters and produce control signals which accurately regulate the engine variables. The control system may be purely electronic, or may be a combination of a unified hydromechanical control which is trimmed in response to an electronic supervisory control. Computers are often incorporated into the controls.

The present invention will be described in terms of a unified hydromechanical control 28 which regulates one or more engine variables in response to input signals both from selected engine parameters and also from an electronic supervisory control 30. The supervisory control 30 is responsive to selected engine parameters to provide trim signals to the unified control 28. A fully integrated electronic control may also be used to practice the present invention.

Since the present invention involves only selected portions of the controls, only those inputs to and outputs from unified control 28 and the supervisory control 30 which are required to describe the invention will be shown, although it should be understood that numerous other functions may be performed by the engine control system.

The fuel supplied to the burner 24 of engine 10 is controlled by an output signal from the unified control 28 shown by fuel line 32. The fuel flow is denoted as $W_f$. As shown, unified control 28 may be adapted to regulate the position of the variable area nozzle 26 rather than controlling fuel flow. Mechanisms for control of these engine variables are well known in the art.

Electronic supervisory control 30 receives input signals indicative of selected engine parameters, namely, a signal indicative of engine inlet temperature ($T_{T2}$) is fed via line 34, a signal indicative of fan rotor speed ($N_1$) is fed via line 36, a signal indicative of fan pressure ratio (PRF) is fed via line 38, and a signal indicative of fan turbine inlet temperature (FTIT) is fed via line 40. These signals are generated by conventional transducers well known to those skilled in the art. The fan pressure ratio signal appearing on signal line 38 may be produced by inserting a pressure probe to sense the pressure known as $P_{T2}$. A second pressure probe is positioned in location $P_{T2.5}$ or $P_{T6}$ (when engine pressure ratio is desired) and the ratio of the two signals is calculated by a suitable calculation indicated by box 39.

As will be described subsequently in detail, the supervisory control 30 generates, in response to the input signals on lines 34, 36, 38 and 40 a trim signal ΔPLA later which will modify the basic fuel control signal $W_f$ produced by the unified control 28. Fuel flow to the engine 10 is regulated in response to a power lever 42 which feeds a power lever angle signal PLA to unified control 28.

The fan rotor speed ($N_1$) signal fed into the supervisory control 30 via line 36 is compensated as shown in block 44 by applying a correction thereto and producing a signal indicative of fan rotor speed corrected to station 2. This signal will be denoted as $N_1C_2$. The correction applied in block 44 may be made by dividing the $N_1$ fan rotor speed signal by $\sqrt{T_{T2}}$. If so, the measured $T_{T2}$ signal on line 34 is also fed to correction block 44 via signal lines 33. This computation and correction is well known to those skilled in the art and may be performed either electronically or by computer. The corrected signal $N_1C_2$ is then fed as as input to a function generator 46 in which a scheduled fan pressure ratio signal (PRFSC) is produced and fed to a comparator 48. The sensed fan pressure ratio signal appearing on signal line 38 is fed to comparator 48 where there is produced an error signal denoted as ΔPRF indicative of the difference between the scheduled fan pressure ratio in block 46 and the sensed fan pressure ratio on line 38. The ΔPRF error signal is then fed to a function generator 50 where there is scheduled a trim signal for fuel flow denoted as ΔPLA which is in turn fed via signal line 52 to a minimum selector 54.

The engine inlet temperature signal $T_{T2}$ appearing on signal line 34 is fed to a function generator 56 where there is produced a signal indicative of a scheduled fan turbine inlet temperature (FTITSC). The scheduled fan turbine inlet temperature signal is then fed to a comparator 58 where it is compared with the actual or sensed fan turbine inlet temperature signal (FTIT) appearing on line 40. Any error between the scheduled fan turbine inlet temperature signal and the sensed fan turbine inlet temperature signal is fed from comparator 58 as an input denoted as ΔFTIT to a function generator 60 where there is scheduled in response thereto a fuel flow correction signal denoted ΔPLA. The ΔPLA signal is then fed as an input to a minimum selector 54 via signal line 62.

The minimum selector 54 selects the signal appearing on lines 52 and 62 which calls for the least fuel flow, and passes through signal line 64 the selected ΔPLA signal. The ΔPLA signal modifies the PLA signal generated by power lever 42 at summation point 70 which in turn produces an output signal indicative of trimmed power lever angle signal imposed on gas generator fuel control 66 which forms a part of the unified control 28. The resulting fuel flow signal $W_f$ on line 32 regulates the amount of fuel fed to burner 24 in a well known manner. As indicated previously, the output from unified control 28 may be used to schedule nozzle area rather than regulate fuel flow.

During normal operation the ΔPLA signal generated in block 50 will be selected by minimum selector 54, but at higher Mach numbers the fan turbine inlet temperature limit signal generated in block 60 will normally be selected in order to prevent an overtemperature in the engine.

As is apparent from the foregoing, this invention closes the loop on the pressure ratio across the fan (PRF) by adjusting fuel flow via the fuel control 66 during a transonic flight condition. In this scheme for all flight conditions the exhaust nozzle 26 is scheduled as a function of rotor speed as described hereinbelow. As noted the area of exhaust nozzle 26 is controlled by control 72 which via actuators 74 (only one being shown) for positioning nozzle flaps accordingly. As illustrated by the block diagram actual rotor speed is sensed and applied to summation junction 78 where it is compared with scheduled $N_1$ generated by function generator 80. As a function of $T_{T2}$ sensed via line 34 the error signal ($\Delta N_1$) is then applied to function generator 82 which produces a $\Delta A_j$ trim signal which, in turn is applied to summer 86. The unified control which schedules the $\Delta_j$ signal in a customary manner produces an output signal to summer 86 whereby the sum of the two signals are then applied to control 72 via signal line 90.

Figure 2:
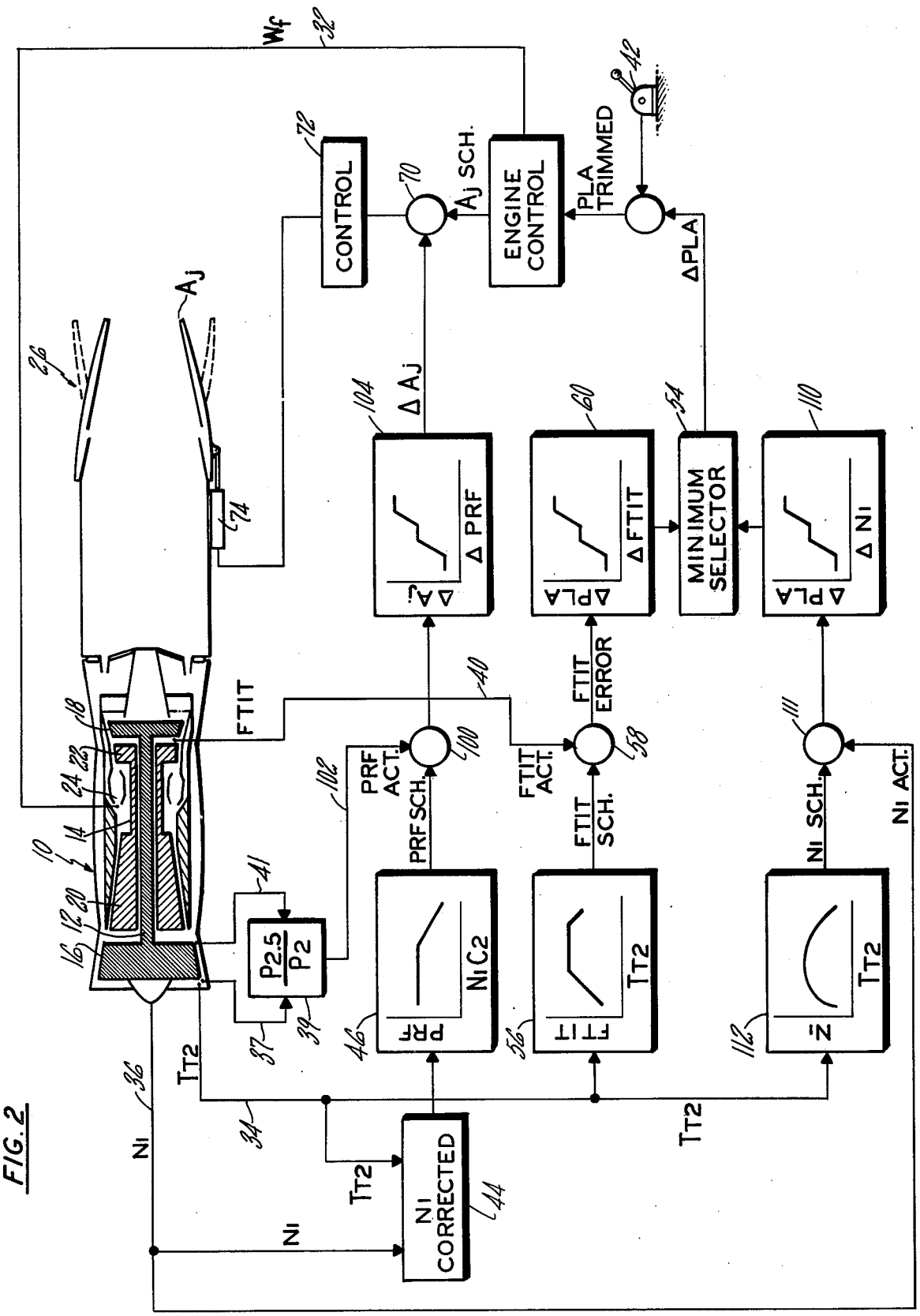
FIG. 2 is a schematic in block diagram wherein the nozzle area is utilized to close loop on fan pressure ratio.

FIG. 2 exemplifies another system for scheduling fan pressure ratio, but does so by closing the loop of pressure ratio by controlling the area of the exhaust nozzle ($A_j$) (In the embodiment like parts embody like reference numerals).

In this instance, the ratio of the fan ($P_{2.5}/P_2$) is computed in a suitable divider 39 by sensing $P_2$ and $P_{2.5}$ via lines 37 and 41 respectively and the output signal is applied to summer 100 via line 102. Summer 102 produces an error signal indicative of the difference between scheduled PRF and actual PRF (ΔPRF), where the scheduled PRF is a function of corrected speed ($N_1C_2$) generated by function generator 46. The ΔPRF signal is applied to function generator 104 which generates a scheduled exhaust nozzle area signal ($\Delta A_j$) as a function of PRF. The output from 104 is applied to summer 70, similar to the manner described in FIG. 1 for trimming the $A_j$ signal developed by the unified control. Likewise, as in the case of the $N_1$ signal, the $A_j$ trimmer signal serves to adjust the exhaust nozzle area to adjust the pressure in engine station 2.5 to obtain the desired pressure ratio for assuring optimum engine operation for subsonic and transonic flight condition.

To assure that the engine does not overheat a minimum select device 54 compares the output from function generator 60, namely the scheduled $\Delta$PLA as a function of $\Delta$FTIT and the output of function generator 110.

The loop developing the signal in box 110 serves to produce a trimmed power lever signal ($\Delta$PLA) as a function of low compressor speed error ($\Delta N_1$). This is obtained by comparing actual $N_1$ with scheduled $N_1$ at comparator 111 which schedule is a function of $T_{T2}$ generated by function generator 112.

The output from minimum select 64 is applied to summer 70 which trims the actual power lever position signal prior to being transmitted to fuel control 66.

As is apparent from the foregoing during the supersonic modes of operation the power lever is trimmed as a function of speed error biased to a $T_{T2}$ schedule. When a subsonic or transonic condition exists the engine control assures that the pressure ratio is maintained at the value scheduled.

GLOSSARY OF TERMS 1,2, 2.5, 3 and 6=these reference subscripts refer to stations in the engine where 2 is engine inlet, 2.5 is fan discharge, 3 is compressor discharge and 6 is core engine discharge $N_1$=low compressor rotational speed in R.P.M.
$N_2$=high compressor rotational speed in R.P.M.
P=pressure in pounds per square inch (psi)
A=area
subscript T=total value
$W_f$=fuel flow in pounds/hour
$\Delta$=differential in calculus It should be understood that the invention is not limited to the particular embodiments shown and described herein, but that various changes and modifications may be made without departing from the spirit or scope of this novel concept as defined by the following claims.

I claim:

1. Control means for controlling a twin-spool gas turbine engine during a subsonic or transonic flight mode having variable area exhaust nozzle powering aircraft, said twin spool including a fan driven by a low turbine, and a compressor driven by a high turbine, and burner means for generating hot gases for driving said turbine, engine control means independently controlling the flow of fuel to said burner and controlling the area of said variable exhaust nozzle, said control means including means responsive to a pressure ratio across a station in said engine for generating a first signal, means responsive to engine rotor speed and engine inlet temperature for generating a second signal indicative of a schedule of said pressure ratio, means responsive to said first signal and said second signal for generating a third signal indicative of pressure ratio error, and means responsive to a function of said third signal for generating a fourth signal for biasing said independent engine control means to further adjust said fuel flow to maintain the pressure ratio schedule of said second signal.

2. Control means as in claim 1 wherein said engine station is the fan or the entire engine, means for limiting the temperature at the inlet of said high turbine including means for generating a fifth signal indicative of the difference between the temperature at the inlet of said low turbine and a schedule of that temperature, which schedule is a function of engine inlet temperature and means for selecting the least value of said fourth signal and fifth signal whereby that signal calling for the least fuel flow will trim said independent fuel control means.

3. Control means as in claim 2 including a power lever for generating a sixth signal for scheduling engine power by adjusting fuel flow, and said fourth or fifth signal modifying said sixth signal.

4. Control means as in claim 3 including means for trimming said independent variable exhaust nozzle area control including means responsive to a function of the difference between actual fan speed and scheduled fan speed, which scheduled fan speed is a function of engine inlet temperature.

5. The method of controlling a twin spool gas turbine engine of the type that includes a fan driven by the low turbine and has fuel and exhaust nozzle area control during a subsonic and transonic aircraft flight mode comprising the steps of
scheduling the pressure ratio across an operating station of the engine as a function of corrected fan speed,
measuring the value of the pressure ratio across that operating station indicated in the previous step,
calculating an error between the scheduled value of the pressure ratio and the actual value, and
trimming the amount of fuel flow delivered to the engine in accordance with the error obtained in the step of calculating.

6. The method as in claim 5 wherein the operating station is the fan.

7. The method as in claim 5 wherein the operating station is the entire engine.

8. The method as in claim 7 including the further step of limiting the temperature of the engine by selecting the lower value of the signal obtained in the step of calculating and a signal indicative of the difference between the actual temperature at the inlet of the low turbine and a scheduled temperature signal, which scheduled temperature signal is a function of the temperature at the inlet of the engine.

9. The method as in claim 8 including the further step of trimming the area of the exhaust nozzle as controlled by the exhaust nozzle area control by a function of the difference between actual fan speed and scheduled fan speed where the scheduled fan speed is a function of engine inlet temperature.

* * * * *